(12) United States Patent
Turek et al.

(10) Patent No.: US 11,378,188 B2
(45) Date of Patent: Jul. 5, 2022

(54) GENERATOR SEAL ASSEMBLY

(71) Applicant: Siemens Energy, Inc., Orlando, FL (US)

(72) Inventors: Louis J. Turek, Orlando, FL (US); Peter Jon Clayton, Casselberry, FL (US); Alexander D. Oyler, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 275 days.

(21) Appl. No.: 16/629,368

(22) PCT Filed: Mar. 6, 2018

(86) PCT No.: PCT/US2018/021123
§ 371 (c)(1),
(2) Date: Jan. 8, 2020

(87) PCT Pub. No.: WO2019/013841
PCT Pub. Date: Jan. 17, 2019

(65) Prior Publication Data
US 2021/0131569 A1    May 6, 2021

Related U.S. Application Data

(60) Provisional application No. 62/530,619, filed on Jul. 10, 2017.

(51) Int. Cl.
*F16J 15/44* (2006.01)
*H02K 5/124* (2006.01)

(52) U.S. Cl.
CPC ............ *F16J 15/442* (2013.01); *H02K 5/124* (2013.01)

(58) Field of Classification Search
CPC .......... F16J 15/442; F16J 15/44; H02K 5/124; H02K 5/04
See application file for complete search history.

(56) References Cited

U.S. PATENT DOCUMENTS 4,082,296 A    4/1978  Stein
4,486,024 A *  12/1984 Cooper ................... F16J 15/40
                                                        277/422

(Continued)

FOREIGN PATENT DOCUMENTS

WO    2008052231 A1    5/2008
WO    2016179608 A2    11/2016

OTHER PUBLICATIONS

International Search Report and Written Opinion dated Jun. 28, 2018 corresponding to PCT Application No. PCT/US2018/021123 filed Mar. 6, 2018.

*Primary Examiner* — Eugene G Byrd

(57) ABSTRACT

A generator seal assembly for preventing leakage of coolant in a generator is presented. The seal assembly includes a coolant side seal ring having a plurality of coolant side seal ring segments. The coolant side seal ring segment includes a seal fluid channel and radial holes circumferentially distributed along the seal fluid channel from leading edge to trailing edge through which seal fluid enters the seal fluid channel. Additional radial holes are circumferentially distributed along the seal fluid channel in a region near leading edge. Additional seal fluid enters the seal fluid channel in the region near leading edge through the additional radial holes such that pressure of seal fluid in the region is increased higher than pressure of the coolant to prevent leakage of the coolant in the region near leading edge due to ration of generator shaft.

21 Claims, 2 Drawing Sheets

(56) References Cited

U.S. PATENT DOCUMENTS

| | | | |
|---|---|---|---|
| 5,509,664 A * | 4/1996 | Borkiewicz | F16J 15/442 277/543 |
| 6,070,881 A * | 6/2000 | Longree | F16J 15/40 277/409 |
| 6,145,843 A | 11/2000 | Hwang | |
| 6,196,790 B1 | 3/2001 | Sheridan et al. | |
| 6,352,265 B1 * | 3/2002 | Ha | F16J 15/40 277/347 |
| 7,229,102 B2 | 6/2007 | Kubala | |
| 7,597,360 B2 | 10/2009 | Kubala | |
| 7,815,224 B2 | 10/2010 | Ford et al. | |
| 8,047,576 B2 | 11/2011 | Ford et al. | |
| 8,919,779 B2 | 12/2014 | Jahn | |
| 2003/0015841 A1 | 1/2003 | Rowe | |
| 2006/0267288 A1 | 11/2006 | Freal et al. | |
| 2007/0114728 A1 | 5/2007 | Schollhorn | |
| 2008/0272552 A1 * | 11/2008 | Zheng | F16J 15/442 277/400 |
| 2012/0251290 A1 | 10/2012 | Turnquist et al. | |
| 2017/0370471 A1 | 12/2017 | Martin | |
| 2018/0003067 A1 | 1/2018 | Bidkar et al. | |
| 2018/0372229 A1 * | 12/2018 | Bidkar | F16J 15/445 |

* cited by examiner

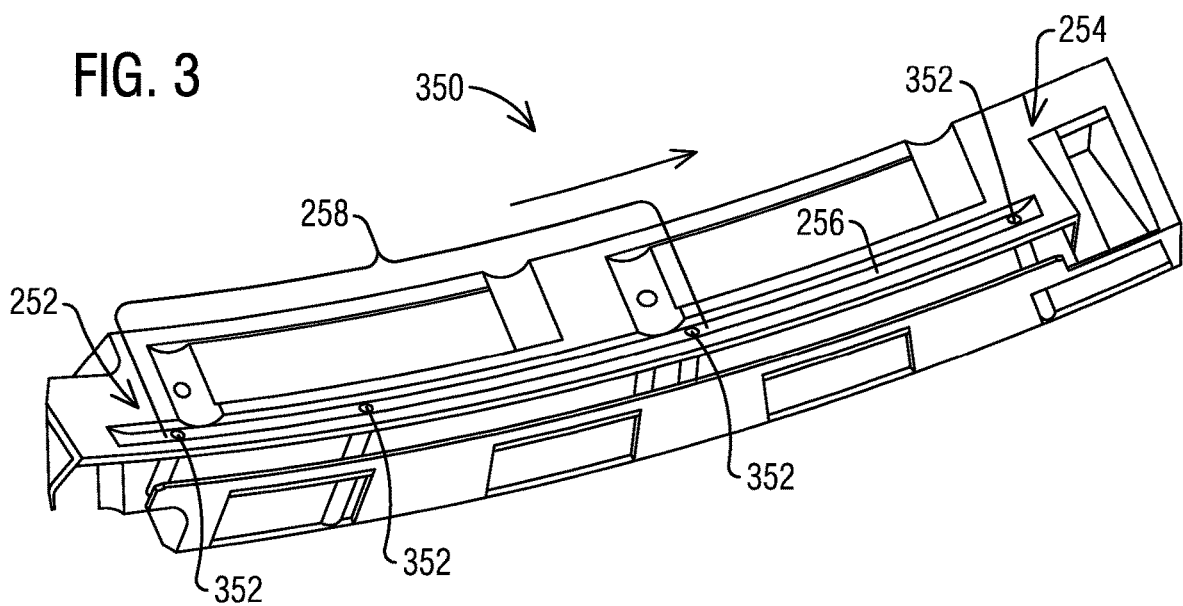
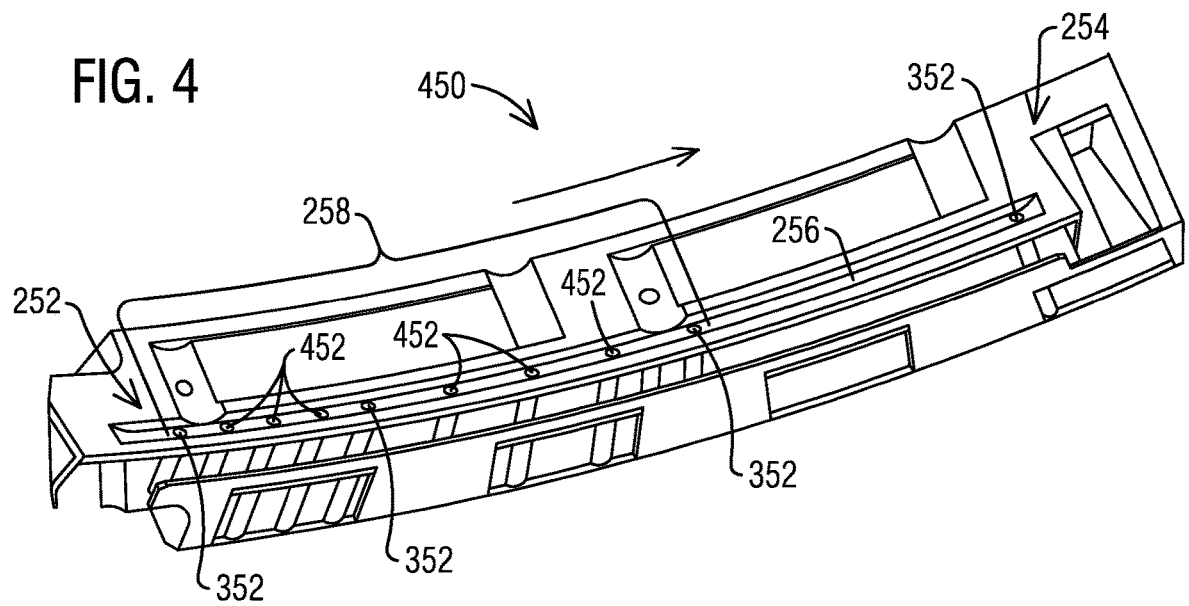

GENERATOR SEAL ASSEMBLY

TECHNICAL FIELD

The present invention relates generally to a seal assembly for preventing coolant leakage in electric machines, in particular, to a seal assembly for a generator.

DESCRIPTION OF RELATED ART

Generator is a component that converts mechanical power to electrical power in power generation industry. Generator typically includes a stator and a rotor each comprised of a plurality of electrical conductors. Heat is generated during generator operation which raises temperature of the conductors. It is necessary to cool the conductors during generation operation.

The conductors may be cooled by pressurized hydrogen which is circulated internally within a frame as a coolant. Seal assemblies are arranged at each end of the generator where the generator shaft penetrates the frame to prevent the coolant escaping from the frame. Seal assembly may include seal rings using pressurized seal fluid to act as a barrier against the escape of the coolant from the frame and against entering of atmospheric air into the frame. Two seal rings may be arranged at each end of the generator, in which one is referred to as air side seal ring and the other is referred to as coolant side seal ring. Each seal ring may consist of a plurality of segments. During generator operation, seal fluid pressure at leading edge of the coolant side seal ring segments may be deprived due to generator shaft rotation. This may result in a region of the coolant side seal ring segments having seal fluid pressure below coolant pressure of the generator, and therefore creating a leak path for the coolant.

SUMMARY OF INVENTION

Briefly described, aspects of the present invention relate to a generator, a seal assembly for a generator and a method for sealing a coolant in a frame of a generator.

According to an aspect, a generator is presented. The generator comprises a frame enclosing a coolant. The generator comprises a rotor shaft axially extending through the frame. The generator comprises a seal assembly circumferentially disposed at an axial end of the generator where the rotor shaft extends through the frame. The seal assembly comprises a seal housing attached to the frame. The seal assembly comprises a coolant side seal ring attached to the seal housing located axially inboard towards the coolant. The coolant side seal ring comprises a plurality of coolant side seal ring segments. Each coolant side seal ring segment comprises a leading edge and a trailing edge with respect to a rotation of the rotor shaft. Each coolant side seal ring segment comprises a seal fluid channel facing the rotor shaft and circumferentially extending over a predefined arc length and a plurality of radial holes circumferentially distributed along the seal fluid channel from the leading edge to the trailing edge through which a seal fluid enters the seal fluid channel. A pressure of the coolant to prevent leakage of the coolant from the frame. The pressure of the seal fluid is deprived below the pressure of the coolant in a region near the leading edge due to the rotation of the rotor shaft. Each coolant side seal ring segment further comprises a plurality of additional radial holes circumferentially distributed along the seal fluid channel in the region near the leading edge. Additional seal fluid enters the region near the leading edge through the additional radial holes such that the pressure of the seal fluid in the region is increased higher than the pressure of the coolant to prevent the leakage of the coolant in the region near the leading edge.

According to an aspect, a seal assembly for a generator is presented. The seal assembly comprises a seal housing. The seal assembly comprises an air side seal ring attached to the seal housing. The seal assembly comprises a coolant side seal ring attached to the seal housing axially spaced apart from the air side seal ring. The coolant side seal ring comprises a plurality of coolant side seal ring segments. Each coolant side seal ring segment comprises a leading edge and a trailing edge with respect to a rotation of the rotor shaft. Each coolant side seal ring segment comprises a seal fluid channel facing the rotor shaft and circumferentially extending over a predefined arc length and a plurality of radial holes circumferentially distributed along the seal fluid channel from the leading edge to the trailing edge through which a seal fluid enters the seal fluid channel. A pressure of the seal fluid is higher than a pressure of the coolant to prevent leakage of the coolant from the frame. The pressure of the seal fluid is deprived below the pressure of the coolant in a region near the leading edge due to the rotation of the rotor shaft. Each coolant side seal ring segment further comprises a plurality of additional radial holes circumferentially distributed along the seal fluid channel in the region near the leading edge. Additional seal fluid enters the region near the leading edge through the additional radial holes such that the pressure of the seal fluid in the region is increased higher than the pressure of the coolant to prevent the leakage of the coolant in the region near the leading edge.

According to an aspect, a method for sealing a coolant in a frame of a generator is presented. The method comprises circumferentially disposing a seal assembly at an axial end of the generator where a rotor shaft extends through the frame. The method comprises providing seal fluid to the seal assembly. A pressure of the seal fluid is higher than a pressure of the coolant for preventing leakage of the coolant from the frame. The seal assembly comprises a seal housing attached to the frame. The seal assembly comprises a coolant side seal ring attached to the seal housing located axially inboard towards the coolant. The coolant side seal ring comprises a plurality of coolant side seal ring segments. Each coolant side seal ring segment comprises a leading edge and a trailing edge with respect to a rotation of the rotor shaft. Each coolant side seal ring segment comprises a seal fluid channel facing the rotor shaft and circumferentially extending over a predefined arc length and a plurality of radial holes circumferentially distributed along the seal fluid channel from the leading edge to the trailing edge through which a seal fluid enters the seal fluid channel. The pressure of the seal fluid is deprived below the pressure of the coolant in a region near the leading edge due to the rotation of the rotor shaft. Each coolant side seal ring segment further comprises a plurality of additional radial holes circumferentially distributed along the seal fluid channel in the region near the leading edge. Additional seal fluid enters the region near the leading edge through the additional radial holes such that the pressure of the seal fluid in the region is increased higher than the pressure of the coolant to prevent the leakage of the coolant in the region near the leading edge.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings:

FIG. 3 illustrates a schematic partial perspective view of a conventional coolant side seal ring segment; and FIG. 4 illustrates a schematic partial perspective view of a modified coolant side seal ring segment according to an embodiment of the invention.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
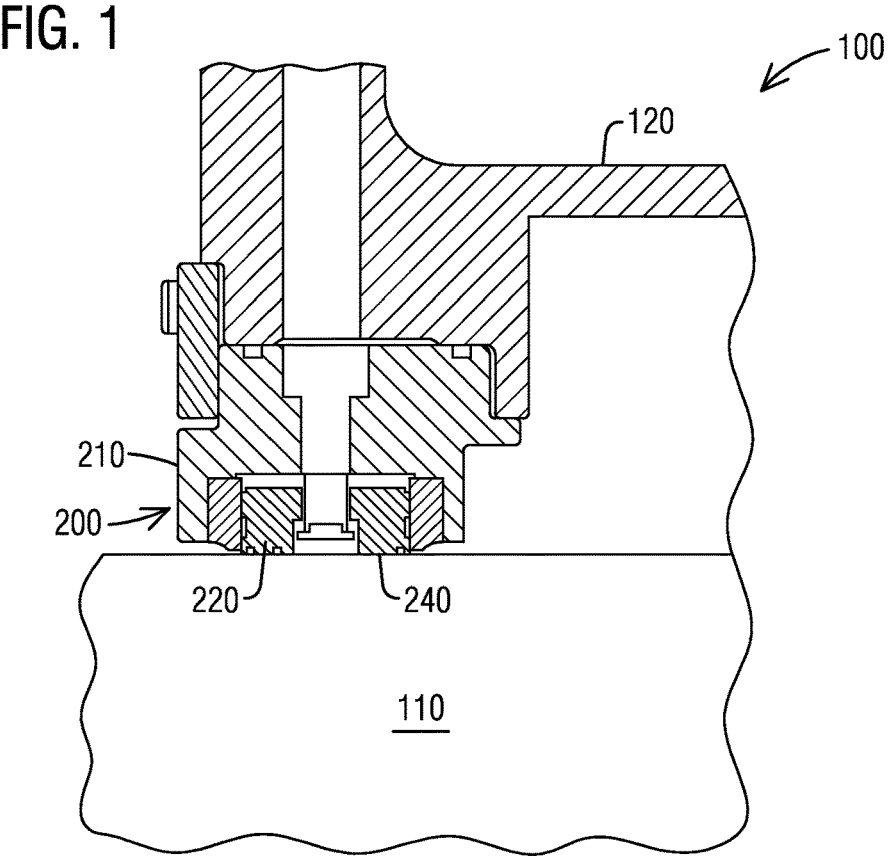
FIG. 1 illustrates a schematic partial cross section view of a generator in which embodiments of the invention may be incorporated.

FIG. 1 illustrates a schematic partial cross section view of a generator 100. The generator 100 includes a rotor shaft 110. The generator 100 includes a frame 120. A coolant, such as hydrogen, may be circulated internally inside the frame 120 to cool components of the generator 100. Atmospheric air is surrounded outside of the frame 120. The generator 100 includes a seal assembly 200 that is circumferentially disposed at each end of the generator 100 where the rotor shaft 110 axially extends through the frame 120 to prevent leakage of the coolant. The seal assembly 200 includes a seal housing 210 attached to the frame 120. The seal assembly 200 includes an air side seal ring 220 and a coolant side seal ring 240 attached to the seal housing 210 and axially apart from each other. The air side seal ring 220 is located axially outboard towards air side. The coolant side seal ring 240 is located axially inboard towards coolant side. Seal fluid, such as oil, is provided into the seal housing 210 and flows at interface between the rotor shaft 110 and the air side seal ring 220 and the coolant side seal ring 240 respectively. The seal fluid is typically pressurized to prevent the coolant from leaving the frame 120 and to prevent the air from entering the frame 120 at the interface. Pressure of the seal fluid is typically higher than both pressure of the coolant within the frame 120 and pressure of the atmospheric air outside the frame 120. The air side seal ring 220 and the coolant side seal ring 240 may be made from any suitable materials, such as carbon graphite.

Figure 2:
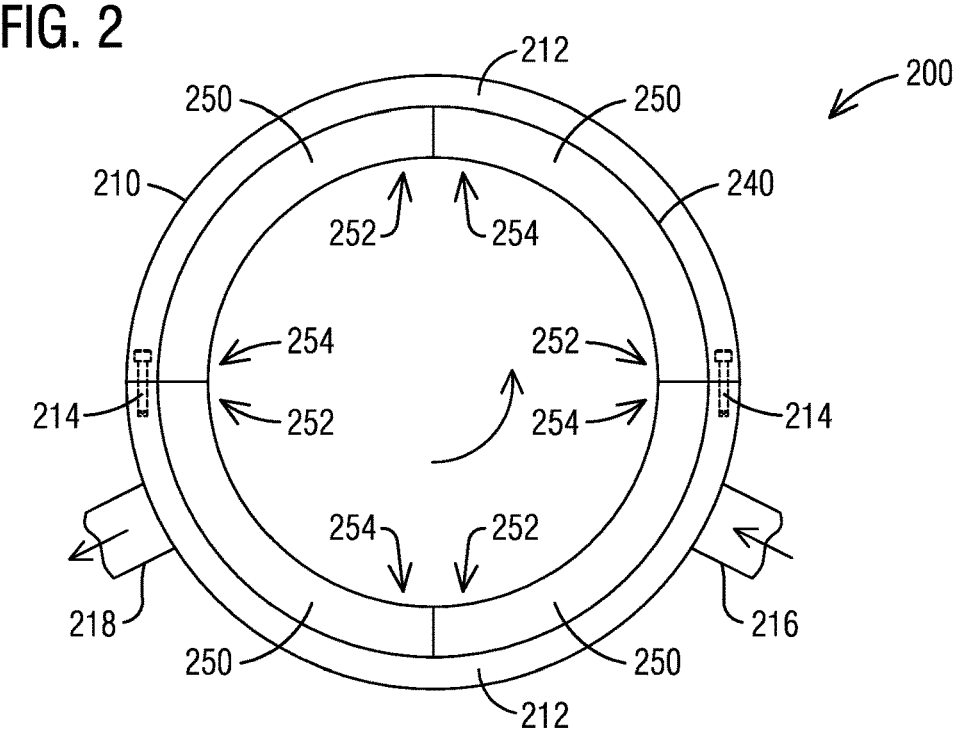
FIG. 2 illustrates a schematic axial end view of a seal assembly looking from a coolant side in which embodiments of the invention may be incorporated.

FIG. 2 illustrates a schematic axial end view of a seal assembly 200 looking from a coolant side. The seal assembly 200 includes a seal housing 210 having an upper half of seal housing 212 and a lower half of seal housing 212 connected to each other by fasteners 214, such as bolts. The coolant side seal ring 240 is attached to the seal housing 210. Seal fluid may be fed into the seal housing 210 through a seal fluid inlet 216 and enter a seal fluid channel 256 (shown in FIG. 3 and FIG. 4) for preventing escape of the coolant. Seal fluid may flow out of the seal fluid channel 256 and exit the seal housing 210 through a seal fluid outlet 218. The coolant side seal ring 240 includes a plurality of coolant side seal ring segments 250. For illustration purpose, FIG. 2 shows the coolant side seal ring 240 having two circumferential coolant side seal ring segments 250 attached on the upper half of seal housing 212 and two circumferential coolant side seal ring segments 250 attached on the lower half of seal housing 212. It is understood that the coolant side seal ring 240 may have more than two circumferential coolant side seal ring segments 250 attached on the upper and lower halves of seal housing 212, respectively. Each coolant side seal ring segment 250 has a leading edge 252 and a trailing edge 254 with respect to a rotation of the rotor shaft 110. For example, the rotor shaft 110 rotates in a counter clock direction within the seal assembly 200 in an arrangement setting of the seal assembly 200 shown in FIG. 2. The air side seal ring 220 may include the similar configuration as the coolant side seal ring 240 shown in FIG. 2.

FIG. 3 illustrates a schematic perspective partial view of a conventional coolant side seal ring segment 350. As shown in FIG. 3, the conventional coolant side seal ring segment 350 includes a seal fluid channel 256 at a surface facing the rotor shaft 110. The seal fluid channel 256 may extend along a circumferential direction over a predefined arc length of the seal ring segment 350. The seal fluid channel 256 may be disposed at an axially inner section of the seal ring segment 350 toward the coolant environment. A plurality of radial holes 352 may be disposed radially throughout the coolant side seal ring segment 350 and circumferentially spaced apart from each other in the seal fluid channel 256. The radial holes 352 are in communication with the seal fluid inlet 216 (shown in FIG. 2) for supplying the seal fluid into the seal fluid channel 256. The radial holes 352 may be circumferentially evenly distributed along the seal fluid channel 256 from the leading edge 252 to the trailing edge 254. The seal fluid channel 256 holds the seal fluid within the channel 256 from flowing into the coolant environment. The radial holes 352 may be formed by drilling. The maximum diameter of the radial holes 352 may be the same as width of the seal fluid channel 256. Diameter of the radial holes 352 may be in an order of 80 thousandths of 1 inch, i.e., 80 thousandths of 25.4 mm.

During generator operation, seal fluid flows from the leading edge 252 toward the trailing edge 254 due to the rotation of the rotor shaft 110. Pressure of the seal fluid in a region 258 near the leading edge 252 may be deprived below pressure of the coolant which may create a leak path for the coolant in the region 258 near the leading edge 252.

FIG. 4 illustrates a schematic perspective partial view of a coolant side seal ring segment 450 according to an embodiment of the invention. As shown in the exemplary embodiment of FIG. 4, a plurality of additional radial holes 452 may be disposed radially throughout the coolant side seal ring segment 450 in the region 258 near the leading edge 252 and circumferentially spaced apart from each other in the seal fluid channel 256. The additional radial holes 452 are in communication with the seal fluid inlet 216 (shown in FIG. 2) and provides additional flow path for the seal fluid entering the seal fluid channel 256 in the region 258 near the leading edge 252. Flow resistance against the seal fluid flowing through the radial holes 352 and the additional radial holes 452 in the region 258 near the leading edge 252 is therefore reduced. Pressure of the seal fluid in the region 258 near the leading edge 252 of the coolant side seal ring segment 450 is thus substantially increased. The pressure of the seal fluid in the region 258 near the leading edge 252 may be increased to a level that is higher than pressure of the coolant. Leakage of the coolant from the frame 120 in the region 258 near the leading edge 252 is prevented.

Diameter of the additional radial holes 452 is determined based on a threshold flow rate of the additional seal fluid such that the pressure of the seal fluid in the region 258 near the leading edge 252 of the coolant side seal ring segment 450 is higher than the pressure of the coolant. The maximum diameter of the additional radial holes 452 may be the same as width of the seal fluid channel 256 to prevent the seal fluid flowing into the coolant environment. The diameter of the additional radial holes 452 may be the same as the diameter of the existing radial holes 352. The additional radial holes 452 may be processed the same as the existing radial holes 352, such as by drilling. Such process streamlines production by using the same drill bit for drilling both the existing radial holes 352 and the additional radial holes 452. The process may avoid potential damage to other nearby geometric features of the coolant side seal ring segment 450. According to an embodiment, diameter of the additional radial holes 452 may be in an order of 80 thousandths of 1 inch, i.e., 80 thousandths of 25.4 mm.

The additional radial holes 452 may be circumferentially evenly distributed along the seal fluid channel 256 in the region 258 near the leading edge 252. Number of the additional radial holes 452 is determined based on a threshold flow rate of the additional seal fluid such that the pressure of the seal fluid in the region 258 near the leading edge 252 of the coolant side seal ring segment 450 is higher than the pressure of the coolant. The number of the additional radial holes 452 is also determined such that the adjacent additional radial holes 452 are spaced apart enough from each other to prevent potential cracking risk of the coolant side seal ring segment 450. According to an embodiment, distance between adjacent additional radial holes 452 may be in a range of 3 to 4 times of diameter of the additional radial holes 452. Distance between the additional radial hole 452 and the existing radial hole 352 may be in a range of 3 to 4 times of diameter of the existing radial holes 352 or the additional radial hole 452.

According to an aspect, the proposed generator seal assembly 200 includes a modified coolant side seal ring segment 450 which modifies geometry of a region 258 near the leading edge 252 of a conventional coolant side seal ring segment 350. The modified coolant side seal ring segment 450 includes additional radial holes 452 circumferentially distributed in the seal fluid channel 256 in the region 258 near the leading edge 252 of the modified coolant side seal ring segment 450. The additional radial holes 452 provides additional seal flow entering the seal fluid channel 256 in the region 258 near the leading edge 252 of the modified coolant side seal ring segment 450 where seal fluid pressure is deprived due to rotation of the rotor shaft 110. The additional seal flow increases the seal fluid pressure in the region 258 near the leading edge 252 so that leakage of coolant in the region 258 near the leading edge 252 is prevented.

According to an aspect, the proposed generator seal assembly 200 having the modified coolant side seal ring segment 450 allows mitigation of the coolant leakage without the need to supply the seal fluid with increased pressure by a seal fluid skid and thus avoid the need to modify the seal fluid skid. The proposed generator seal assembly 200 having the modified coolant side seal ring segment 450 may also reduce seal fluid flowing into the coolant environment of the generator 100 and thus preserve coolant purity.

According to an aspect, the proposed generator seal assembly 200 having the modified coolant side seal ring segment 450 provides a cost saving and efficient design improvement to prevent coolant leakage and may be implemented in other electric machines using coolant, such as motors, or turbines, etc.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator
110: Rotor Shaft
120: Frame
200: Seal Assembly
210: Seal Housing
212: Seal Housing Half
214: Fastener
216: Seal Fluid Inlet
218: Seal Fluid Outlet
220: Air Side Seal Ring
240: Coolant Side Seal Ring
250: Coolant Side Seal Ring Segment
252: Leading Edge of Coolant Side Seal Ring Segment
254: Trailing Edge of Coolant Side Seal Ring Segment
256: Seal Fluid Channel
258: Region Near Leading Edge
350: Conventional Coolant Side Seal Ring Segment
352: Existing Radial Holes of Coolant Side Seal Ring Segment
450: Modified Coolant Side Seal Ring Segments
452: Extra Radial Holes in Region near Leading Edge What claimed is:

1. A generator comprising:
a frame enclosing a coolant;
a rotor shaft axially extending through the frame; and
a seal assembly circumferentially disposed at an axial end of the generator where the rotor shaft extends through the frame,
wherein the seal assembly comprises a seal housing attached to the frame,
wherein the seal assembly comprises a coolant side seal ring attached to the seal housing located axially inboard towards the coolant,
wherein the coolant side seal ring comprises a plurality of coolant side seal ring segments,
wherein each coolant side seal ring segment comprises a leading edge and a trailing edge with respect to a rotation of the rotor shaft,
wherein each coolant side seal ring segment comprises:

a seal fluid channel facing the rotor shaft and circumferentially extending over a predefined arc length, and a plurality of radial holes circumferentially distributed along the seal fluid channel from the leading edge to the trailing edge through which a seal fluid enters the seal fluid channel, wherein the seal fluid flows from the leading edge toward the trailing edge due to the rotation of the rotor shaft during an operation of the generator that reduces a pressure of the seal fluid in a region near the leading edge, wherein each coolant side seal ring segment further comprises a plurality of additional radial holes circumferentially distributed along the seal fluid channel in the region near the leading edge, wherein additional seal fluid enters the region near the leading edge through the additional radial holes to maintain the pressure of the seal fluid in the region near the leading edge above a pressure of the coolant, wherein the radial holes and the additional radial holes cooperate to define inlet holes, and wherein a distance between adjacent inlet holes is smaller in the region near the leading edge than a distance between adjacent inlet holes near the trailing edge.

2. The generator as claimed in claim 1, wherein diameter of the additional radial holes in the region near the leading edge is determined based on a threshold flow rate of the additional seal fluid such that the pressure of the seal fluid in the region near the leading edge is higher than the pressure of the coolant.

3. The generator as claimed in claim 1, wherein the maximum diameter of the additional radial holes is the same as width of the seal fluid channel.

4. The generator as claimed in claim 1, wherein number of the additional radial holes is determined based on a threshold flow rate of the additional seal fluid such that the pressure of the seal fluid in the region near the leading edge is higher than the pressure of the coolant.

5. The generator as claimed in claim 1, wherein number of the additional radial holes is determined such that distance between adjacent additional radial holes is enough to prevent cracking in the region near the leading edge of the coolant side seal ring segment.

6. The generator as claimed in claim 1, wherein distance between adjacent additional radial holes is in a range of 3 to 4 times of diameter of the additional radial holes.

7. The generator as claimed in claim 1, wherein the additional radial holes are circumferentially evenly distributed along the seal fluid channel in the region near the leading edge.

8. A seal assembly for a generator comprising:
a seal housing;
an air side seal ring attached to the seal housing; and
a coolant side seal ring attached to the seal housing axially spaced apart from the air side seal ring,
wherein the coolant side seal ring comprises a plurality of coolant side seal ring segments,
wherein each coolant side seal ring segment comprises a leading edge and a trailing edge with respect to a rotation of a rotor shaft of the generator,
wherein each coolant side seal ring segment comprises:
a seal fluid channel facing the rotor shaft and circumferentially extending over a predefined arc length, and a plurality of radial holes circumferentially distributed along the seal fluid channel from the leading edge to the trailing edge through which a seal fluid enters the seal fluid channel, wherein the seal fluid flows from the leading edge toward the trailing edge due to the rotation of the rotor shaft during an operation of the generator that reduces a pressure of the seal fluid in a region near the leading edge, wherein each coolant side seal ring segment further comprises a plurality of additional radial holes circumferentially distributed along the seal fluid channel in the region near the leading edge, wherein additional seal fluid enters the region near the leading edge through the additional radial holes to maintain the pressure of the seal fluid in the region near the leading edge above a pressure of the coolant, wherein the radial holes and the additional radial holes cooperate to define inlet holes, and wherein a distance between adjacent inlet holes is smaller in the region near the leading edge than a distance between adjacent inlet holes near the trailing edge.

9. The seal assembly as claimed in claim 8, wherein diameter of the additional radial holes in the region near the leading edge is determined based on a threshold flow rate of the additional seal fluid such that the pressure of the seal fluid in the region near the leading edge is increased to higher than the pressure of the coolant.

10. The seal assembly as claimed in claim 8, wherein the maximum diameter of the additional radial holes is the same as width of the seal fluid channel.

11. The seal assembly as claimed in claim 8, wherein number of the additional radial holes is determined based on a threshold flow rate of the additional seal fluid such that the pressure of the seal fluid in the region near the leading edge is higher than the pressure of the coolant.

12. The seal assembly as claimed in claim 8, wherein number of the additional radial holes is determined such that distance between adjacent additional radial holes is enough to prevent cracking in the region near the leading edge of the coolant side seal ring segment.

13. The seal assembly as claimed in claim 8, wherein distance between adjacent additional radial holes is in a range of 3 to 4 times of diameter of the additional radial holes.

14. The seal assembly as claimed in claim 8, wherein the additional radial holes are circumferentially evenly distributed along the seal fluid channel in the leading edge.

15. A method for sealing a coolant in a frame of a generator comprising:
circumferentially disposing a seal assembly at an axial end of the generator where a rotor shaft extends through the frame; and
providing seal fluid to the seal assembly,
wherein the seal assembly comprises a seal housing attached to the frame,
wherein the seal assembly comprises a coolant side seal ring attached to the seal housing located axially inboard towards the coolant,
wherein the coolant side seal ring comprises a plurality of coolant side seal ring segments,
wherein each coolant side seal ring segment comprises a leading edge and a trailing edge with respect to a rotation of the rotor shaft,
wherein each coolant side seal ring segment comprises:

a seal fluid channel facing the rotor shaft and circumferentially extending over a predefined arc length, and a plurality of radial holes circumferentially distributed along the seal fluid channel from the leading edge to the trailing edge through which the seal fluid enters the seal fluid channel, wherein the seal fluid flows from the leading edge toward the trailing edge due to the rotation of the rotor shaft during an operation of the generator that reduces a pressure of the seal fluid in a region near the leading edge, wherein each coolant side seal ring segment further comprises a plurality of additional radial holes circumferentially distributed along the seal fluid channel in the region near the leading edge, wherein additional seal fluid enters the region near the leading edge through the additional radial holes to maintain the pressure of the seal fluid in the region near the leading edge above a pressure of the coolant, wherein the radial holes and the additional radial holes cooperate to define inlet holes, and wherein a distance between adjacent inlet holes is smaller in the region near the leading edge than a distance between adjacent inlet holes near the trailing edge.

16. The method as claimed in claim 15, wherein diameter of the additional radial holes in the region near the leading edge is determined based on a threshold flow rate of the additional seal fluid such that the pressure of the seal fluid in the region near the leading edge is increased higher than the pressure of the coolant.

17. The method as claimed in claim 15, wherein the maximum diameter of the additional radial holes is the same as width of the seal fluid channel.

18. The method as claimed in claim 15, wherein number of the additional radial holes is determined based on a threshold flow rate of the additional seal fluid such that the pressure of the seal fluid in the region near the leading edge is higher than the pressure of the coolant.

19. The method as claimed in claim 15, wherein number of the additional radial holes is determined such that distance between adjacent additional radial holes is enough to prevent cracking in the region near the leading edge of the coolant side seal ring segment.

20. The method as claimed in claim 15, wherein distance between adjacent additional radial holes is in a range of 3 to 4 times of diameter of the additional radial holes.

21. The method as claimed in claim 15, wherein the additional radial holes are circumferentially evenly distributed along the seal fluid channel in the region near the leading edge.

* * * * *